United States Patent
Suleiman et al.

(10) Patent No.: US 12,436,277 B2
(45) Date of Patent: Oct. 7, 2025

(54) METHOD FOR ELEVATION ANGLE ESTIMATION BASED ON AN ULTRASOUND SENSOR

(71) Applicant: Continental Automotive GmbH, Hannover (DE)

(72) Inventors: Wassim Suleiman, Frankfurt (DE); Christopher Brown, Seligenstadt (DE); Robin Adams, Frankfurt am Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 86 days.

(21) Appl. No.: 17/753,669

(22) PCT Filed: Aug. 31, 2020

(86) PCT No.: PCT/EP2020/074176
§ 371 (c)(1),
(2) Date: Mar. 10, 2022

(87) PCT Pub. No.: WO2021/047927
PCT Pub. Date: Mar. 18, 2021

(65) Prior Publication Data
US 2022/0334250 A1    Oct. 20, 2022

(30) Foreign Application Priority Data
Sep. 12, 2019    (EP) .................... 19196984

(51) Int. Cl.
*G01S 15/89*    (2006.01)
*G01S 7/52*    (2006.01)
(Continued)

(52) U.S. Cl.
CPC .......... *G01S 15/89* (2013.01); *G01S 7/5202* (2013.01); *G01S 7/52025* (2013.01); *G01S 15/582* (2013.01); *G01S 15/60* (2013.01)

(58) Field of Classification Search
None
See application file for complete search history.

(56) References Cited

U.S. PATENT DOCUMENTS

| 5,596,550 A * | 1/1997 | Rowe, Jr. ............ G10K 11/348 |
| | | 367/103 |
| 2013/0128699 A1* | 5/2013 | Schmid .................. G01S 13/46 |
| | | 367/99 |

(Continued)

FOREIGN PATENT DOCUMENTS

| CN | 102258384 | 11/2011 |
| CN | 102884443 | 1/2013 |

(Continued)

OTHER PUBLICATIONS

Beamforming, Microphone Array. "Application Note AN-1140." InvenSense Inc., Dec. 31 (2013): 12. (Year: 2013).*

(Continued)

*Primary Examiner* — Isam A Alsomiri
*Assistant Examiner* — Jonathan D Armstrong

(57) ABSTRACT

A method for determining the elevation angle and/or azimuth angle of a signal received by an ultrasound sensor includes: providing an ultrasound sensor with a frequency-dependent radiation pattern; transmitting a first ultrasound wave at a first frequency; transmitting a second ultrasound wave at a second frequency different from the first frequency; receiving reflections of the first and second waves, the reflections being caused by an object; and determining the elevation angle of the first and second reflected waves based on amplitudes of the reflections of the first and second waves. Determining the elevation angle (and/or azimuth angle includes calculating a ratio between the amplitudes of received reflections of the first and second waves and mapping a calculated ratio to an elevation angle and/or azimuth angle. The mapping is based on a predetermined (Continued)

ratio curve or ratio dataset which associates a certain amplitude ratio to an elevation angle and/or azimuth angle.

13 Claims, 4 Drawing Sheets

(51) Int. Cl.
*G01S 15/58* (2006.01)
*G01S 15/60* (2006.01)

(56) References Cited

U.S. PATENT DOCUMENTS

| | | | | |
|---|---|---|---|---|
| 2014/0022109 | A1* | 1/2014 | Lee | G01S 7/2813 342/70 |
| 2014/0126822 | A1* | 5/2014 | Underwood | G06T 7/521 382/174 |
| 2014/0269212 | A1 | 9/2014 | Xiang | |
| 2015/0285904 | A1* | 10/2015 | Rao | G01S 13/06 342/146 |
| 2015/0323660 | A1* | 11/2015 | Hampikian | G01S 13/347 342/109 |
| 2018/0106885 | A1 | 4/2018 | Blayvas | |
| 2018/0149511 | A1* | 5/2018 | Ploss | G01N 29/12 |
| 2019/0079188 | A1 | 3/2019 | Bariant | |
| 2021/0018592 | A1* | 1/2021 | Laghezza | G01S 7/412 |

FOREIGN PATENT DOCUMENTS

| | | |
|---|---|---|
| DE | 102010028829 A1 | 11/2011 |
| DE | 102012004320 A1 | 9/2013 |
| DE | 102013207823 A1 | 10/2014 |
| DE | 102016105022 | 9/2017 |
| DE | 102018100567 A1 | 7/2019 |
| DE | 102018101324 A1 | 7/2019 |
| DE | 102018103490 A1 | 8/2019 |
| JP | 3324821 B2 * | 9/2002 |
| JP | 2012215490 A * | 11/2012 |
| JP | 2014132220 A | 7/2014 |
| JP | 2015025739 A | 2/2015 |
| WO | 2017157483 A1 | 9/2017 |

OTHER PUBLICATIONS

Notice of Reasons for Refusal dated Nov. 9, 2022 for the counterpart Japanese Patent Application No. 2022-507451.
European Patent Office Examination and Partial Search Report dated Feb. 21, 2020 for the counterpart European Patent Application No. 19196984.9.
European Patent Office Search Report dated Mar. 17, 2020 for the counterpart European Patent Application No. 19196984.9.
The International Search Report and the Written Opinion of the International Searching Authority mailed on Dec. 17, 2020 for the counterpart PCT Application No. PCT/EP2020/07416.
Office Action dated Aug. 26, 2024 for counterpart China patent application 20208005906.2, with translation.
Chinese Office Action dated Jan. 9, 2025 for the counterpart Chinese Patent Application No. 202080059106.2 and machine translation of same.
Decision to Grant a Patent proposed Jun. 20, 2022 for the counterpart Japanese Patent Application No. 2022 507451 and machine translation of same.

* cited by examiner

METHOD FOR ELEVATION ANGLE ESTIMATION BASED ON AN ULTRASOUND SENSOR

CROSS REFERENCE TO RELATED APPLICATIONS

This application claims priority to PCT Application PCT/EP2020/074176, filed Aug. 31, 2020, which claims priority to European Application 19196984.9, filed Sep. 12, 2019. The disclosures of the above applications are incorporated herein by reference.

FIELD OF INVENTION

The present invention relates generally to the field of ultrasound sensors. More specifically, the invention relates to a method and a system for determining the elevation angle and/or azimuth angle of a signal received by an ultrasound sensor.

BACKGROUND

Height or elevation angle estimation using one-dimensional (1D) ultrasound sensors is fundamentally very difficult due to physical restrictions. Such ultrasound sensors are often used for distance measurements. Elevation angle may be determined based on geometric approaches, like rate-of-closing method. Said method is based on tracking the rate of closing to an object, e.g. a curb and exploiting the distance difference travelled by an ultrasound wave to an reflecting object that is below the sensor compared to an reflecting object which is at sensor height.

Other sensing methodologies include a camera-assisted approach in which the elevation of the object is estimated in a 2D-image or a direction-of-arrival-method based on multiple sensors for estimating elevation angle based on triangulation.

The afore mentioned methodologies suffer from several drawbacks. One-dimensional rate-of-closing method relies on the correct association of reflections made over time to the same object. A wrong association means not only wrong height estimation but also a missed detection. Camera and multiple antenna based methods do not exploit the cost and mechanical robustness advantages of 1D-ultrasound sensors.

SUMMARY

It is an objective of the embodiments of the invention to provide a method for determining the elevation angle of a signal received by an ultrasound sensor, specifically a 1D-ultrasound sensor, in a robust and cost-effective way. The objective is solved by the features of the independent claims. Preferred embodiments are given in the dependent claims. If not explicitly indicated otherwise, embodiments of the invention can be freely combined with each other.

According to an aspect, the invention refers to a method for determining the elevation angle and/or azimuth angle of a signal received by an ultrasound sensor. The ultrasound sensor may be specifically a one-dimensional (1D) ultrasound sensor, i.e. a sensor which does not comprise physical sensor means for determining elevation angle (e.g. two sensor portions with different alignment for determining elevation). The method comprises the following steps:

First, an ultrasound sensor, specifically a 1D ultrasound sensor, with a frequency-dependent radiation pattern is provided. "Frequency-dependent radiation pattern" means that the gain or sensitivity of the sensor in a certain direction defined by azimuth and elevation angle shows a frequency dependency, i.e. changes when varying ultrasound frequency.

As a further step, at least a first ultrasound wave is transmitted at a first frequency. Said first frequency may be a fixed frequency of a transmission pulse. Alternatively, said first frequency may be a frequency value of a chirped signal, i.e. a signal with changing frequency according to a ramp or in a stepped way.

As a further step, a second ultrasound wave is transmitted at a second frequency. Said second frequency may be a fixed frequency of a transmission pulse. Alternatively, said second frequency may be a frequency value of a chirped signal, i.e. a signal with changing frequency according to a ramp or in a stepped way. The second frequency has a frequency value different to first frequency.

After transmission of first and second ultrasound waves, reflections of the first and second ultrasound waves are received by said ultrasound sensor. Said reflections are caused by a certain object, specifically one and the same object, e.g. a curb, a car, a wall in the surrounding of the ultrasound sensor.

Finally, the elevation angle and/or azimuth angle of the first and second reflected ultrasound waves is determined based on amplitudes of the reflections of the first and second ultrasound waves. Said determination step may use information regarding the frequency dependency of the radiation pattern to determine or estimate the elevation angle and/or azimuth angle.

Determining the elevation angle and/or azimuth angle is performed by calculating a ratio between the amplitudes of received reflections of first and second ultrasound waves and mapping the calculated ratio to an elevation angle and/or azimuth angle, wherein said mapping is performed based on a predetermined ratio curve or ratio dataset which associates a certain amplitude ratio to an elevation angle and/or azimuth angle. Said ratio curve or ratio dataset may be sensor-specific information indicative for the frequency dependency of the radiation pattern of the ultrasound sensor.

Said method is advantageous because elevation information and/or azimuth information can be derived by using frequency dependency of the ultrasound sensor thereby maintaining cost and mechanical robustness advantages of ultrasound sensors. Furthermore, based on the amplitude ratio it is possible to determine the elevation angle and/or azimuth angle independent of the height of actual amplitude of the ultrasound wave.

According to an embodiment, the radiation pattern of the ultrasound sensor narrows with increasing frequency. In other words, angle of aperture of radiation pattern at which the sensor sensitivity is decreased to a certain sensitivity value is lower at higher frequencies. Also a vice versa configuration may be possible, i.e. the radiation pattern of the ultrasound sensor broadens with decreasing frequency. Thereby using at least two ultrasound frequencies with a certain frequency gap leads to an amplitude difference which is indicative for elevation angle and/or azimuth angle.

According to an embodiment, the step of determining the elevation angle comprises removing ambiguities of the radiation pattern in the vertical direction. The radiation characteristics of the ultrasound sensor may be symmetric to a horizontal or essentially horizontal plane. Said symmetry may lead to ambiguities, i.e. a certain detection is not associated to a single elevation angle but at least to a pair of elevation angles. By removing the ambiguities an unambiguous association of a detection to an elevation angle is possible.

According to an embodiment, ambiguities of the radiation pattern in the vertical direction are removed by using at least one ultrasound sensor providing an asymmetric radiation pattern in the vertical direction. Said asymmetry may be a frequency-dependent asymmetry. Thereby, using two or more ultrasound waves with different frequencies may lead to unambiguous elevation information.

According to an embodiment, ambiguities of the radiation pattern in the vertical direction are removed by using received reflections of at least one further ultrasound sensor. Said further ultrasound sensor may comprise a different alignment or may comprise an asymmetric radiation pattern in the vertical direction.

According to an embodiment, ambiguities of the radiation pattern in the vertical direction are removed assuming that a detected object is arranged in the lower half-space. Said assumption exploits the fact that—in typical driving situations—objects are far more likely to be low and place on the ground, rather than high and hanging downwardly.

According to an embodiment, ambiguities of the radiation pattern in the vertical direction are removed by using at least one further sensor using a technology different to ultrasound. Such sensor may be, for example, a camera, a radar sensor and/or a LIDAR sensor already installed at the vehicle for further driving assistance applications. Based on such further sensor, the ambiguity can be resolved by evaluating information provided by said further sensor.

According to an embodiment, the azimuth angle of the object is determined based on at least one further ultrasound sensor located at a different position. Typically multiple ultrasound sensors are arranged around the car, e.g. at different positions at the bumper. Information provided by one or more neighbored ultrasound sensors can be used to determine azimuth information.

According to an embodiment, transmitting first and second ultrasound waves is performed by providing a frequency-modulated transmit pulse to the ultrasound sensor. Thereby, the transmit pulse comprises at least two different frequencies based on which the elevation angle can be determined.

According to an embodiment, said frequency-modulated transmit pulse comprises a linearly or non-linearly (e.g. exponentially) varied frequency over time. For example the frequency of the transmit pulse may be chirped from a start frequency to a stop frequency. Thereby, an ultrasound signal comprising multiple frequencies is transmitted and the reflections of said signal can be evaluated for determining elevation angle.

According to an embodiment, said frequency-modulated transmit pulse comprises a frequency varying in steps over time. In other words, a stepped frequency-modulated ultrasound signal is transmitted. Such stepped frequency-modulated ultrasound signal comprises multiple distinct frequencies which can be used for determining elevation angle.

Alternatively, multiple transmit pulses having different center frequencies are provided to the ultrasound sensor. Said transmit pulses may be transmitted at different points of time in order to be able to evaluate the reflected signal between said pulses.

According to a further aspect, an embodiment of the invention relates to a driving assistance system comprising at least one ultrasound sensor having a frequency-dependent radiation pattern and a control entity for controlling the provision of ultrasound signals to the ultrasound sensor. The control entity is configured to:
  initiate the transmission of at least a first ultrasound wave at a first frequency;
  initiate the transmission of at least a second ultrasound wave at a second frequency different to the first frequency;
  receive information regarding reflections of the first and second ultrasound waves, said reflections being caused by a certain object;
  determine the elevation angle and/or azimuth angle of the first and second reflected ultrasound waves based on the amplitudes of the reflections of the first and second ultrasound waves; and
  determine the elevation angle and/or azimuth angle by calculating a ratio between the amplitudes of received reflections of first and second ultrasound waves and map the calculated ratio to an elevation angle and/or azimuth angle, wherein said mapping is performed based on a predetermined ratio curve or ratio dataset which associates a certain amplitude ratio to an elevation angle and/or azimuth angle.

According to yet a further aspect, the invention relates to a vehicle comprising a driving assistance system. The driving system is configured to perform a method according to anyone of the aforementioned embodiments.

The term "vehicle" as used in the present disclosure may refer to a car, truck, bus, train or any other crafts.

The term "ultrasound sensor" may refer to a sensor configured to transmit and receive sound waves with frequencies above 20 kHz.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
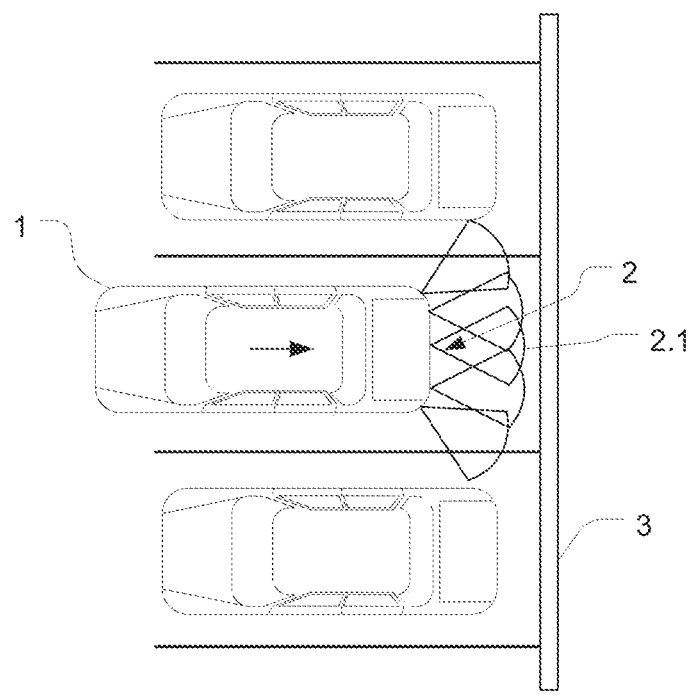
FIG. 1 shows a schematic illustration of a parking situation in which a vehicle is parking into a parking space.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 shows a schematic top view on a parking situation in which a vehicle 1 is parking into a parking space being bordered by a curb 3.

The vehicle 1 comprises a driving assistance system having multiple ultrasound sensors 2 being placed at different positions at the vehicle 1.

The curb 3 may comprise a certain height and can be detected by said driving assistance system, specifically by one or more ultrasound sensors 2 of the driving assistance system.

Figure 2:
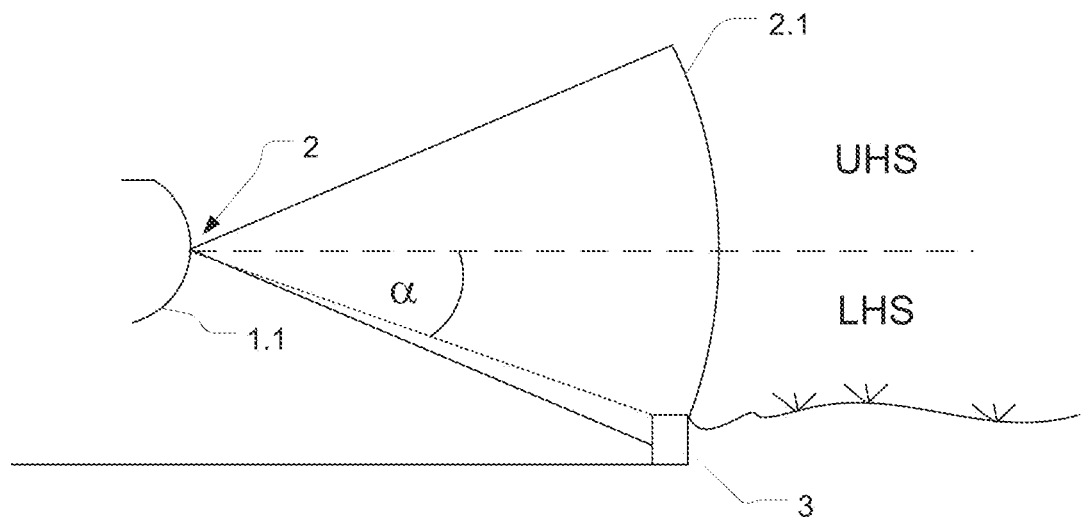
FIG. 2 schematically illustrates the radiation pattern of an ultrasound sensor included in a bumper in the parking situation of FIG. 1.

FIG. 2 shows a side-view of the parking situation. On the left side, a bumper 1.1 of the vehicle 1 is shown which may comprise one or more ultrasound sensors 2. The ultrasound sensor 2 may have a radiation pattern 2.1 comprising a lower radiation pattern portion which covers a lower half-space LHS and an upper radiation pattern portion which covers an upper half-space UHS. The dashed line indicates a horizontal plane dividing the radiation pattern 2.1 in said lower radiation pattern portion and said upper radiation pattern portion. A curb 3 may be located in said lower half-space LHS.

Figure 3:
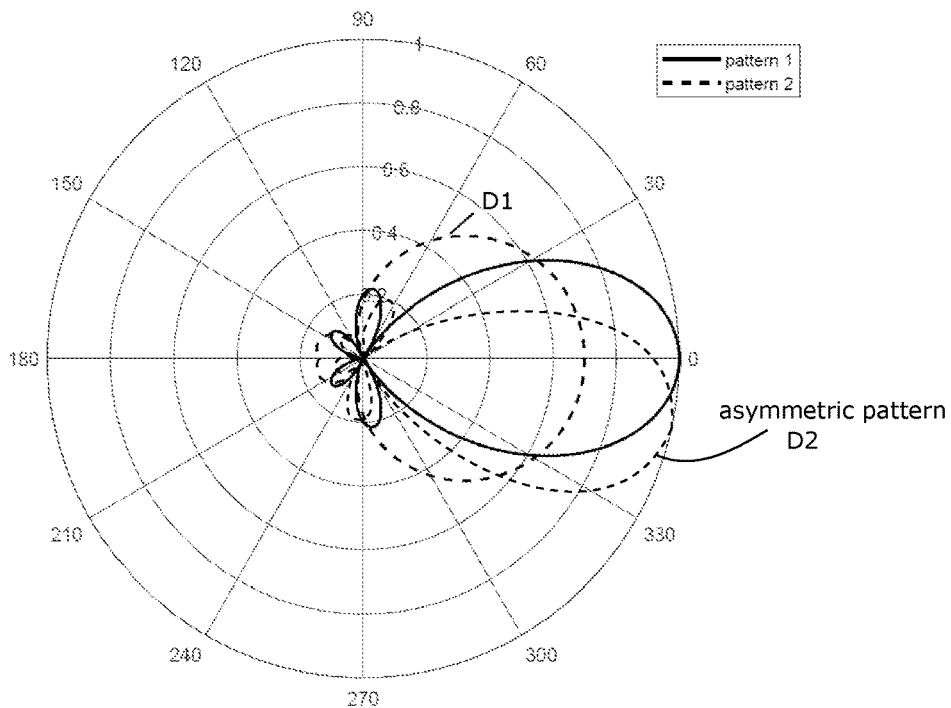
FIG. 3 illustrates the gain of an ultrasound sensor dependent on elevation angle for two different ultrasound frequencies.

FIG. 3 shows the radiation pattern 2.1 of an ultrasound sensor 2 in vertical direction, i.e. the angle values refer to elevation angle, at different frequency values. The solid line indicates the radiation pattern 2.1 at a first frequency and the dashed line D1 indicates the radiation pattern 2.1 at a second frequency, said first and second frequencies being different and said first frequency being higher than the second frequency. As shown, the radiation pattern 2.1 of the ultrasound sensor 2 narrows with increasing frequency. FIG. 3 also shows second dashed lines D2 indicating a third radiation pattern that is asymmetric in the vertical direction.

Therefore, by providing ultrasound waves to the ultrasound sensor 2 at at least two different frequencies and evaluating the amplitudes of the reflected waves having different frequencies, the elevation angle α of an object (in the present example the curb 3) causing said reflections can be determined. More specifically, the elevation angle α can be determined by comparing the amplitudes of the reflected waves. Due to the frequency dependency of the radiation pattern leading to different shapes of radiation pattern and therefore an elevation dependency of the radiation pattern, the elevation angle α of the object can be determined.

The step of comparing the amplitudes of the reflected waves comprises calculating a ratio of the amplitudes of the reflected waves and mapping said ratio to an elevation value, wherein said mapping is performed based on a predetermined ratio curve or ratio dataset which associates a certain amplitude ratio to an elevation angle and/or azimuth angle.

Figure 4:
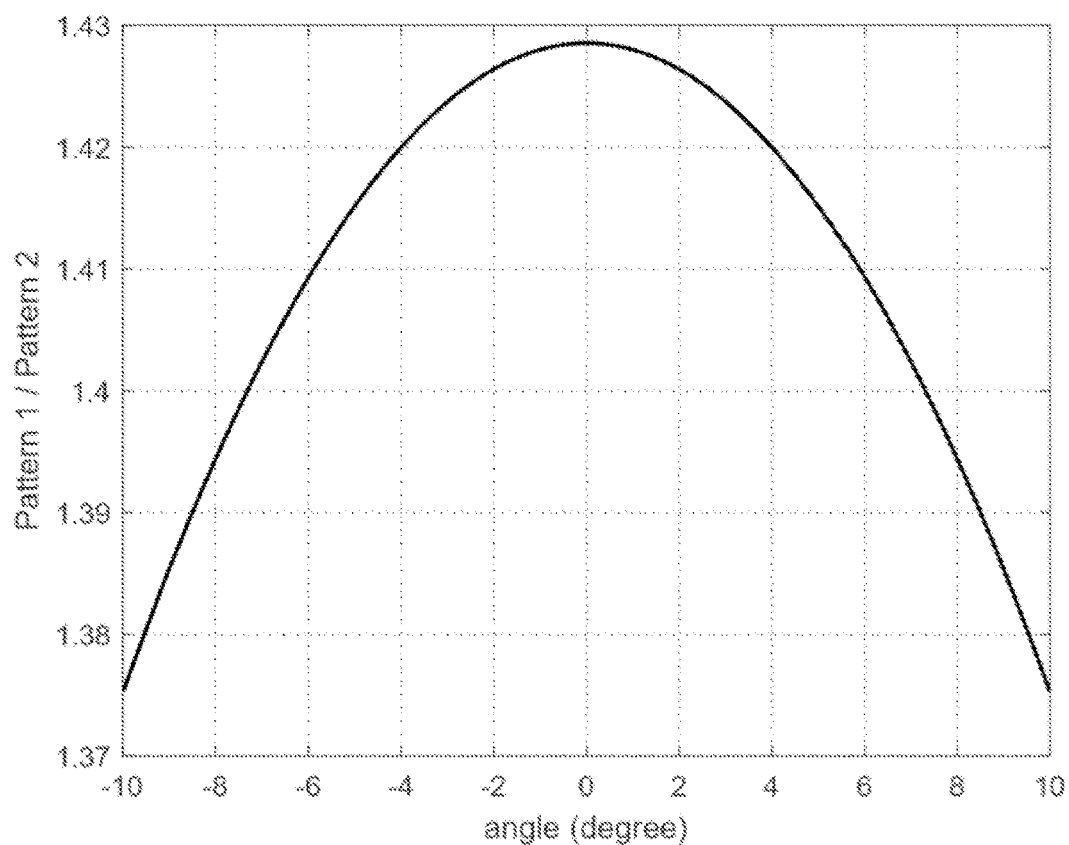
FIG. 4 illustrates the ratio of gain of an ultrasound sensor dependent on elevation angle according to FIG. 3.

FIG. 4 shows a graph illustrating the quotient of amplitudes of reflected waves having different frequency and being received from different elevation angles. By means of said graph, a ratio value of a first reflected wave having a first frequency and a second reflected wave having a second frequency can be associated to an elevation angle.

Figure 5:
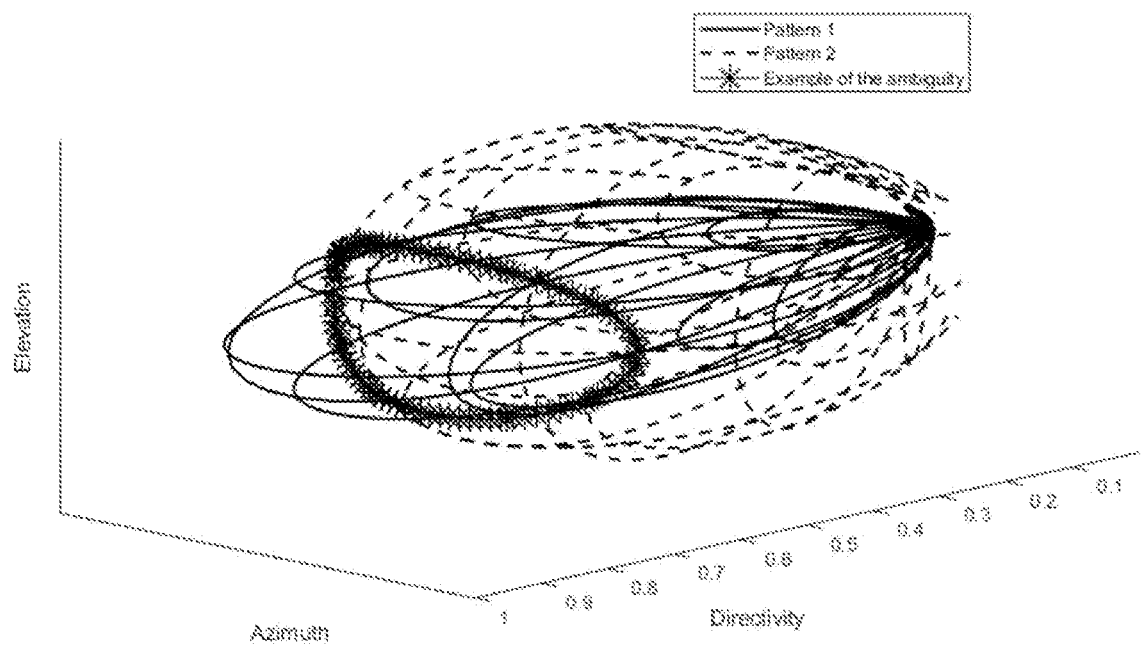
FIG. 5 illustrates the 2D-radiation pattern of an ultrasound sensor dependent on azimuth and elevation angles for two different ultrasound frequencies.

As shown in FIGS. 3 to 5, the radiation pattern 2.1 may be symmetric or essentially symmetric with respect to a centre elevation angle. In the present example, the centre elevation angle may be, for example, 0° or essentially 0°, i.e. the radiation pattern 2.1 may be symmetric with respect to a horizontal plane. According to other embodiments, the ultrasound sensors installed in the vehicle 1 may be pitched slightly upwards. Thus, for example, the centre elevation angle may be in the range between 1° to 10°, especially in the range between 1° to 4°. Said symmetry of radiation pattern 2.1 may lead to an ambiguity in determining elevation angle, i.e. a certain amplitude ratio of the reflected waves can be associated with at least two elevation angles. A first, positive elevation angle may be arranged in the upper half-space UHS and a second, negative elevation angle may be arranged in the lower half-space LHS.

Said ambiguity of elevation angle can be resolved in different ways:

According to a first embodiment, a further sensor, specifically an ultrasound sensor having a radiation pattern being non-symmetric with respect to the horizontal symmetry plane of the other sensors can be used. Based on a measured amplitude derived from said further sensor, the ambiguity can be remedied.

According to another embodiment, the ambiguity can be remedied by assuming that the detected object is always arranged in the lower half-space LHS because in the vast majority of cases, said assumption leads to a correct detection result.

According to yet another embodiment, the ambiguity can be remedied by using a further information source, e.g. a further ultrasound sensor with an inclined radiation pattern (i.e. the beam maximum of radiation pattern is not arranged in the first sensor's horizontal plane). A further example may be a sensor using technology different to ultrasound, e.g. a camera, radar sensor, LIDAR sensor etc.

Also information obtained by said one or more ultrasound sensors at different positions of the vehicle 1 can be used to remove ambiguities. In other words, multiple information gathered at different vehicle positions along the trajectory are exploited to remove ambiguities.

As shown in FIG. 5, the radiation pattern of an ultrasound sensor may have a 2D-shape, i.e. a certain beam shape in view of azimuth and elevation. Therefore also ambiguity of detection results occurs in the horizontal direction, i.e. in azimuth. In order to resolve azimuth ambiguity, information of a further sensor located at a different location (e.g. at a different position on the bumper) can be used. A preferred technique for remedying azimuth ambiguity may be trilateration.

As mentioned before, determination of elevation angle exploits the frequency dependency of radiation pattern of an ultrasound sensor 2, i.e. the 2D-shape of radiation beam is dependent on the frequency of the ultrasound wave. Said ultrasound waves having at least two different frequencies can be generated as follows:

According to a first embodiment, two or more transmit pulses having different centre frequencies can be used.

According to a second embodiment, a frequency-modulated transmit pulse can be used. Said frequency-modulated transmit pulse may be, for example, a linear frequency-modulated signal (also called "chirp signal").

According to a third embodiment, a single frequency-modulated transmit pulse can be used where the frequency follows a step function.

Figure 6:
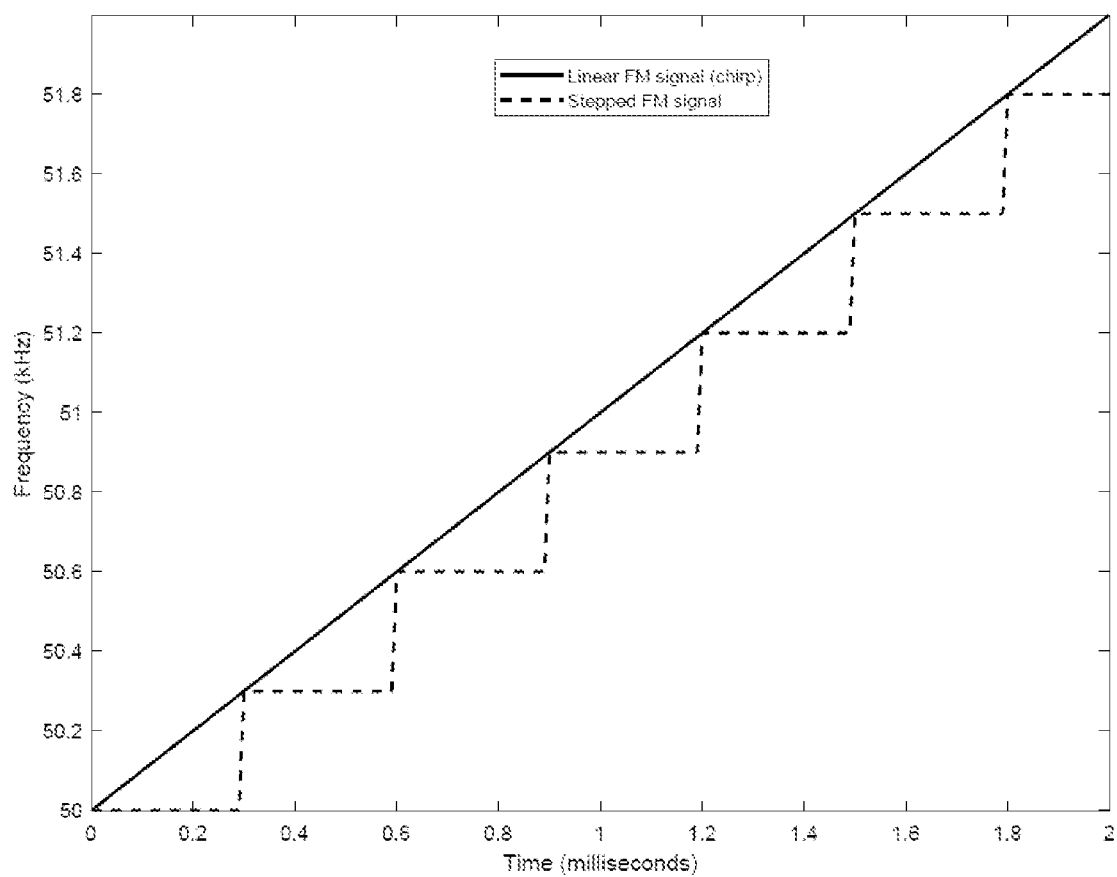
FIG. 6 illustrates a linearly frequency-modulated first ultrasound signal and a stepped frequency-modulated second ultrasound signal.

FIG. 6 shows a linear frequency-modulated signal and a stepped frequency-modulated signal. The frequency of linear frequency-modulated signal changes linearly over time, whereas the frequency of stepped frequency-modulated signal changes stepwise over time.

Figure 7:
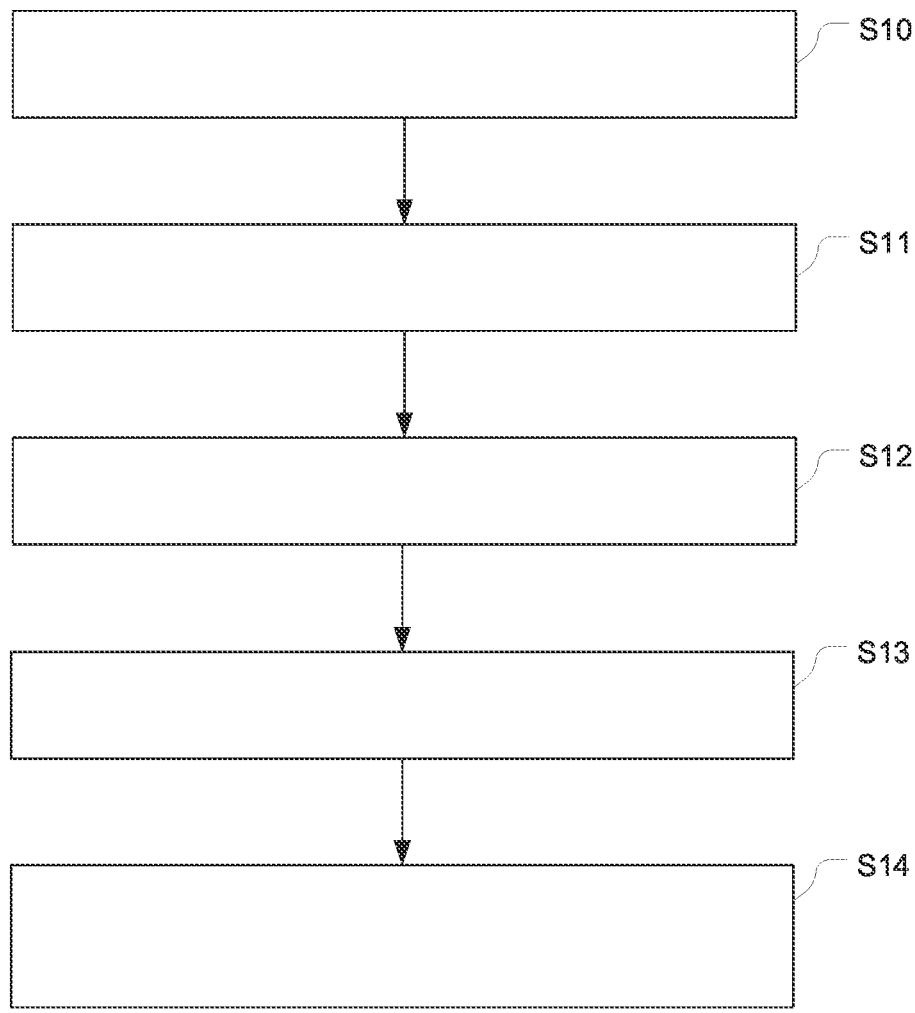
FIG. 7 shows a schematic block diagram illustrating the steps of a method for determining the elevation angle of a signal received by an ultrasound sensor.

FIG. 7 shows a block diagram illustrating method steps of a method for determining the elevation angle α of a signal received by an ultrasound sensor 2.

First, an ultrasound sensor 2 with a frequency-dependent radiation pattern is provided (S10).

Said ultrasound sensor 2 transmits at least a first ultrasound wave at a first frequency (S11) and at least a second ultrasound wave at a second frequency different to the first frequency (S12).

After transmitting said ultrasound waves, reflections of the first and second ultrasound waves are received, said reflections being caused by a certain object (S13).

After receiving said reflections, the elevation angle α of the first and second reflected ultrasound waves is determined based on the amplitudes of the reflections of the first and second ultrasound waves (S14), wherein determining the elevation angle α is performed by calculating a ratio between the amplitudes of received reflections of first and second ultrasound waves and mapping the calculated ratio to an elevation angle α, and wherein said mapping is performed based on a predetermined ratio curve or ratio dataset which associates a certain amplitude ratio to an elevation angle.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 vehicle
1.1 bumper
2 ultrasound sensor
2.1 radiation pattern
3 curb
LHS lower half-space
UHS upper half-space

The invention claimed is:

1. A method for determining the elevation angle of a signal received by an ultrasound sensor, the method comprising:
providing an ultrasound sensor with a frequency-dependent radiation pattern;
transmitting, by the ultrasound sensor, at least a first ultrasound wave at a first frequency;
transmitting, by the ultrasound sensor, at least a second ultrasound wave at a second frequency different from the first frequency;
receiving, by the ultrasound sensor, reflections of the first and second ultrasound waves, the reflections being caused by a certain object;
determining the elevation angle of the first and second reflected ultrasound waves based on amplitudes of the reflections of the first and second ultrasound waves;
wherein determining the elevation angle is performed by calculating a ratio between the amplitudes of the reflections of the first and second ultrasound waves and mapping the calculated ratio to an elevation angle,
wherein the mapping is performed based on a predetermined ratio curve or ratio dataset which associates a certain amplitude ratio to a corresponding elevation angle,
wherein determining the elevation angle comprises removing ambiguities of the radiation pattern in a vertical direction, the ambiguities comprising a plurality of elevation angles corresponding to the calculated ratio, and
wherein the ambiguities of the radiation pattern in the vertical direction are removed by using at least one ultrasound sensor providing an asymmetric radiation pattern in the vertical direction, and
wherein the radiation pattern is divided into an upper half-space portion and a lower-half-space portion with a horizontal plane separating the upper half-space portion and the lower half-space portion, the plurality of elevation angles corresponding to the calculated ratio comprises a first elevation angle in the upper half-space portion and a second elevation angle in the lower half-space portion, and the ambiguities of the radiation pattern in the vertical direction are removed by removing the first elevation angle based up an assumption that a detected object is arranged in the lower half-space portion such that the ambiguity associated with the first elevation angle is removed.

2. The method according to claim 1, wherein the radiation pattern of the ultrasound sensor narrows with increasing frequency.

3. The method according to claim 1, wherein the ambiguities of the radiation pattern in the vertical direction are removed by using received reflections of at least one further ultrasound sensor.

4. The method according to claim 1, wherein ambiguities of the radiation pattern in the vertical direction are removed by using at least one further sensor using a technology different to ultrasound.

5. The method according to claim 1, wherein transmitting the first and second ultrasound waves is performed by providing a frequency-modulated transmit pulse to the ultrasound sensor.

6. The method according to claim 5, wherein the frequency-modulated transmit pulse comprises a linearly or non-linearly varied frequency over time.

7. The method according to claim 5, wherein the frequency-modulated transmit pulse comprises frequency varying in steps over time.

8. The method according to claim 1, further comprising providing multiple transmit pulses having different center frequencies to the ultrasound sensor.

9. A vehicle comprising a driving assistance system, the driving assistance system configured to perform a method according to claim 1.

10. A driving assistance system comprising at least one ultrasound sensor having a frequency-dependent radiation pattern and a controller for controlling a provision of ultrasound signals to the ultrasound sensor, the controller being configured to:
initiate transmission of at least a first ultrasound wave at a first frequency;
initiate transmission of at least a second ultrasound wave at a second frequency different from the first frequency;
receive information regarding reflections of the first and second ultrasound waves, the reflections being caused by a certain object;

determine an elevation angle of the first and second reflected ultrasound waves based on amplitudes of the reflections of the first and second ultrasound waves;

wherein the elevation angle is determined by calculating a ratio between the amplitudes of received reflections of first and second ultrasound waves and mapping the calculated ratio to an elevation angle, wherein the mapping is performed based on a predetermined ratio curve or ratio dataset which associates a certain amplitude ratio to a corresponding elevation angle, wherein determining the elevation angle comprises removing ambiguities of the radiation pattern in a vertical direction, the ambiguities comprising a plurality of elevation angles corresponding to the certain object, and wherein the radiation pattern is divided into an upper half-space portion and a lower-half-space portion with a horizontal plane separating the upper half-space portion and the lower half-space portion, the plurality of elevation angles corresponding to the calculated ratio comprises a first elevation angle in the upper half-space portion and a second elevation angle in the lower half-space portion, and the ambiguities of the radiation pattern in the vertical direction are removed based upon an assumption that a detected object is arranged in the lower half-space portion such that the ambiguity associated with the first elevation angle is removed.

11. A driving assistance system comprising at least one ultrasound sensor having a frequency-dependent radiation pattern, the driving assistance system being configured to:

initiate transmission of at least a first ultrasound wave at a first frequency;

initiate transmission of at least a second ultrasound wave at a second frequency different from the first frequency;

receive information regarding reflections of the first and second ultrasound waves, the reflections being caused by a certain object;

determine the elevation angle of the first and second reflected ultrasound waves based on the amplitudes of the reflections of the first and second ultrasound waves;

wherein the elevation angle is determined by calculating a ratio between the amplitudes of received reflections of first and second ultrasound waves and mapping the calculated ratio to an elevation angle, wherein the mapping is performed based on a predetermined ratio curve or ratio dataset which associates a certain amplitude ratio to a corresponding elevation angle, wherein determining the elevation angle comprises removing ambiguities of the radiation pattern in a vertical direction, the ambiguities comprising a plurality of elevation angles corresponding to the certain object, and wherein the radiation pattern is divided into an upper half-space portion and a lower-half-space portion with a horizontal plane separating the upper half-space portion and the lower half-space portion, the plurality of elevation angles corresponding to the calculated ratio comprises a first elevation angle in the upper half-space portion and a second elevation angle in the lower half-space portion, and the ambiguities of the radiation pattern in the vertical direction are removed based upon an assumption that a detected object is arranged in the lower half-space portion such that the ambiguity associated with the first elevation angle is removed.

12. The driving assistance system according to claim 11, wherein the ambiguities of the radiation pattern in the vertical direction are removed by using at least one ultrasound sensor providing an asymmetric radiation pattern in the vertical direction.

13. The driving assistance system according to claim 11, wherein the ambiguities of the radiation pattern in the vertical direction are removed by using at least one ultrasound sensor providing an asymmetric radiation pattern in the vertical direction.

* * * * *